Aug. 7, 1945.　　　T. P. HALL　　　2,381,350
AIRPLANE FAIRINGS
Filed Nov. 8, 1944　　　2 Sheets-Sheet 1
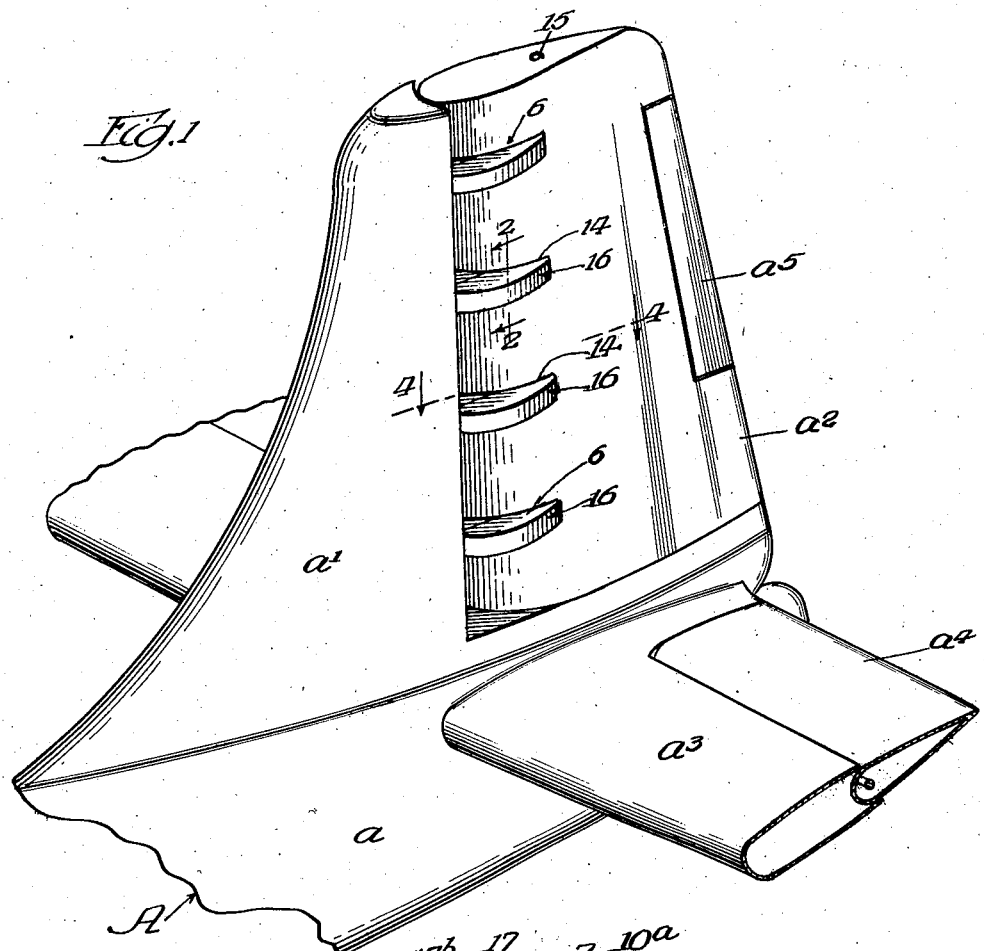
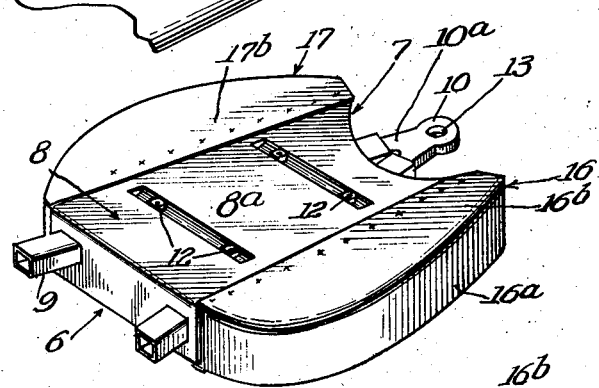
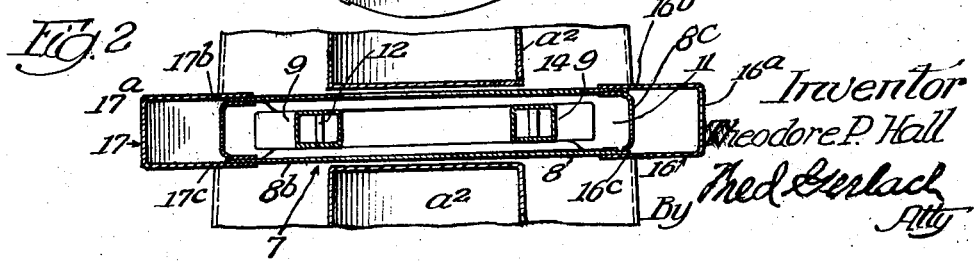
Inventor
Theodore P. Hall
By Fred Gerlach
Atty

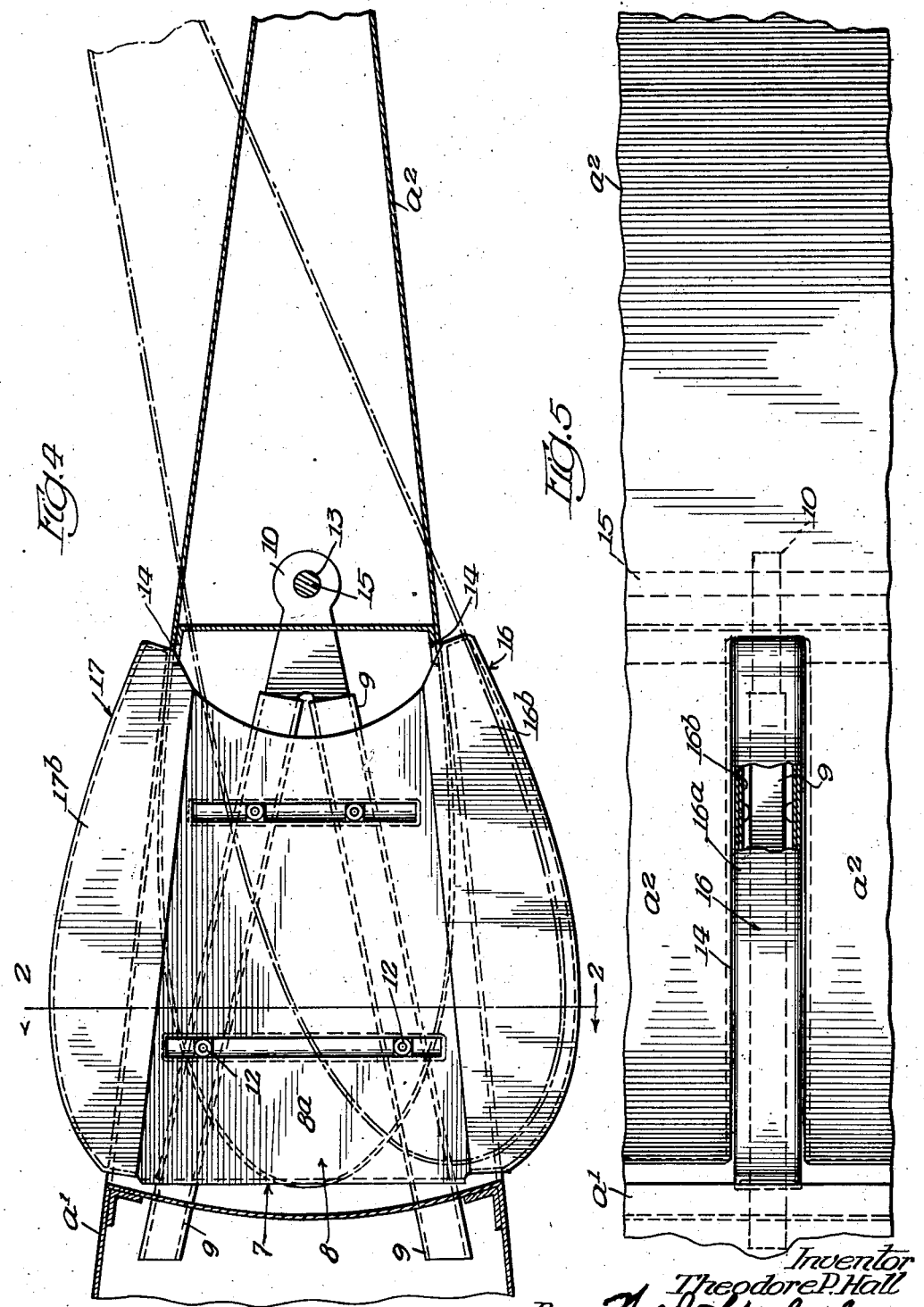

Patented Aug. 7, 1945

2,381,350

UNITED STATES PATENT OFFICE 2,381,350

AIRPLANE FAIRINGS

Theodore P. Hall, San Diego, Calif., assignor to Consolidated Vultee Aircraft Corporation, San Diego, Calif., a corporation of Delaware Application November 8, 1944, Serial No. 562,441

5 Claims. (Cl. 244—130)

The present invention relates to airplane fairings.

In the manufacture or fabrication of an airplane it is customary or standard practice to connect a movable counterbalanced control surface, such as a rudder, to the trailing portion of the forwardly disposed fixed surface of the airplane by means of hinges in the form of hinge brackets which are connected to, and project rearwards from, the fixed surface and extend into notches in the leading portion of the control surface and a pivot rod which is carried by the control surface, extends through holes in the rear ends of the brackets and is disposed rearwards of the leading edge of the control surface. During flight of an airplane having a counterbalanced control surface that is hinged in the aforementioned manner it has been found that when the control surface is deflected or swung for airplane maneuvering purposes eddy currents and turbulences are formed or produced in the region of the notches and in the leading portion of the control surface and such currents and turbulences result in pronounced fluttering or buffeting of the control surface.

The primary object of the present invention is to eliminate in connection with an airplane having a counterbalanced control surface with hinge bracket receiving notches in its leading portion, the formation of eddy currents and turbulences adjacent the notches when the surface is deflected or angularly adjusted during a flight maneuver. This object is attained by providing fairings which are located at the sides of the hinge brackets and serve so to fill and streamline the notches in the leading portion of the control surface that when the control surface is deflected the portions or surfaces adjacent the hinge areas present a smooth or streamline contour to the slip stream of the airplane.

Another object of the invention is to provide fairings for airplane hinge brackets which are attached to, and form a part of, the brackets and are so designed and constructed that they effectively and efficiently fulfill their intended purpose.

Other objects of the invention and the various advantages and characteristics of the present airplane hinge bracket fairings will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a perspective of an airplane empennage having rudder supported hinge brackets with fairings embodying the invention;

Figure 2 is an enlarged vertical section taken on the line 2—2 of Figure 1 and showing in detail the construction and arrangement of one of the fairing-equipped hinge brackets;

Figure 3 is a perspective of the hinge bracket shown in Figure 2;

Figure 4 is an enlarged horizontal section taken on the line 4—4 of Figure 1 and illustrating in detail the manner in which the fairings at the sides of the hinge brackets so fill and streamline the notches in the leading portion of the rudder that when the rudder is deflected the portions or surfaces adjacent the hinge areas present a smooth and streamline contour to the slip stream of the airplane and hence eliminate eddy currents and turbulences adjacent the notches and resultant fluttering or buffeting of the rudder; and Figure 5 is an enlarged side view of the bracket that is shown in Figures 2, 3 and 4.

The invention is exemplified in connection with an airplane A having a fuselage $a$ and an empennage at the rear end of the fuselage. As shown in Figure 1 of the drawings, the empennage comprises an upstanding vertical fin $a^1$, a rudder $a^2$, a horizontal stabilizer $a^3$, and a pair of elevators $a^4$. The horizontal stabilizer projects outwards in both directions from the rear end of the fuselage $a$ and has the elevators $a^4$ pivotally connected to its trailing portion, as well understood in the art. The vertical fin $a^1$ is connected to, and projects upwards from, the upper portion of the rear end of the fuselage and has its trailing portion substantially straight, although forwardly bulged or arcuate in cross section. The rudder $a^2$ is disposed directly behind the vertical fin and is of the counter balanced variety. It has a control tab $a^5$ at its trailing edge and is pivotally connected to the trailing portion of the vertical fin by a plurality of hinges 6 in order that it is capable of swinging laterally or horizontally. The central and rear portions of the rudder are rearwardly tapered and the front portion of the rudder is transversely rounded or curved.

The hinges 6 are shown as being four in number although more or less may be employed, depending upon the height and size of the rudder. They are spaced vertically and equidistantly apart and comprise hinge brackets 7. The latter are suitably connected to, and project rearwards from, the trailing portion of the vertical fin $a^1$ and each consists of a rearwardly tapered horizontally elongated boxlike housing 8, a pair of rearwardly convergent tubes 9 and a pivot member 10. The housings 8 of the hinge brackets 7 embody substantially flat top walls $8^a$, substantially flat bottom walls $8^b$ and channel shaped side walls $8^c$. The top and bottom walls are spaced vertically apart, as shown in Figure 3, and define with the channel shaped side walls $8^c$ compartments 11 in which the pairs of tubes 9 are disposed. The top flanges of the side walls $8^c$ extend inwards and underlie and are welded or otherwise fixedly secured to the side margins of the top walls $8^a$ and the bottom flanges of the side walls extend inwards and overlie and are welded or otherwise fixedly secured to the side margins of the bottom walls $8^b$. The front ends of the tubes 9 project forwards of the front ends of the box-like housings 8 and are suitably secured to certain structural elements in the trailing portion of the vertical fin $a^1$. The central portions of the tubes are connected to the housings by bolts 12 which extend through aligned holes in the top and bottom walls of the housings. The pivot members 10 of the hinge brackets 7 are located behind the rear ends of the tubes 9 and have in the rear ends thereof vertically aligned holes 13. The front ends of the pivot members are bifurcated so as to form forwardly divergent arms $10^a$ and these fit within the rear ends of the tubes 9. The hinge brackets 7 fit within horizontally extending notches 14 in the leading portion of the rudder $a^2$. In addition to the hinge brackets 7 the hinges 6 embody a vertically extending pivot rod 15 and this is fixedly secured within the rudder $a^2$ and extends loosely through the holes 13 in the rear ends of the pivot members 10 of the hinge brackets 7. As shown in the drawings the pivot rod 15 is located adjacent the rear ends of the notches 14 in the leading portion of the rudder and constitutes the articulation or pivot axis of the rudder. Because of the position of the pivot rod with respect to the leading edge of the rudder the rudder is essentially of the counterbalanced variety. The pivot rod is, however, located forwards of the vertical center line of the rudder but inwards of the leading edge of the rudder.

In order so to fill and streamline the notches 14 in the leading portion of the rudder $a^2$ that when the rudder is deflected in either direction to its fullest extent the pressure sides of the hinge areas present a smooth or streamline contour to the slip stream of the airplane and hence eliminate eddy currents and turbulences and resultant fluttering and buffeting of the rudder, the brackets 7 of the hinges 6 are provided on the port or left hand sides thereof with fairings 16 and on their starboard or right hand sides with fairings 17. These fairings are preferably formed of sheet metal although it is to be understood that they may be formed of other material. They are complemental as best shown in Figure 3 and are disposed adjacent and outwards of the side walls $8^c$ of the hinge bracket housings 8.

The fairings 16 are channel shaped in cross section and consist of vertically extending walls $16^a$, integral inwardly extending top walls $16^b$ and integral inwardly extending bottom walls $16^c$. They are coextensive so far as the adjacent or opposed side walls $8^c$ are concerned and serve to reenforce or strengthen the hinge brackets 7 as a whole. The inner margins of the top walls $16^b$ of the fairings 16 overlie and are welded or otherwise fixedly secured to the adjacent side margins of the top walls $8^a$ of the housings 8 and the inner margins of the bottom walls $16^c$ underlie and are welded or otherwise fixedly secured to the adjacent side margins of the bottom walls $8^b$ of the housings 8. The vertically extending walls $16^a$ are spaced outwards from the adjacent side walls $8^c$ of the housings and are horizontally curved in such manner that when the rudder $a^2$ is swung substantially to its fullest extent in a counterclockwise direction as viewed in Figures 1 and 4, it is substantially coplanar with the left hand side of the leading portion of the rudder and hence fills and streamlines the pressure sides of the notches 14. As shown in the drawings the top and bottom walls $16^b$ and $16^c$ of the fairings 16 are spaced apart a distance slightly less than the height of the notches 14 with the result that when the rudder is swung or turned in a counterclockwise direction to substantially its fullest extent the fairings 16 effect filling and sealing of the pressure sides of the notches.

The fairings 17 are channel shaped in cross section and consist of vertically extending walls $17^a$, integral inwardly extending top walls $17^b$ and integral inwardly extending bottom walls $17^c$. They are coextensive with the adjacent or opposed side walls $8^c$ of the housings 8 and serve, like the fairings 16, to reenforce or strengthen the hinge brackets 7 as a whole. The inner margins of the top walls $17^b$ of the fairings 17 overlie and are welded or otherwise fixedly secured to the adjacent side margins of the top walls $8^a$ of the housings 8 and the inner margins of the bottom walls $17^c$ underlie and are welded or otherwise fixedly secured to the adjacent side margins of the bottom walls $8^b$. The vertically extending walls $17^a$ are spaced outwards of the adjacent side walls $8^c$ of the housings and are horizontally curved in such manner that when the rudder $a^2$ is swung substantially to its fullest extent in a clockwise direction as viewed in Figures 1 and 4, it is substantially coplanar with the right hand side of the leading portion of the rudder and hence fills and streamlines the pressure sides of the notches 14. As shown in the drawings the top and bottom walls $17^b$ and $17^c$ of the fairings 17 are spaced apart the same distance as the top and bottom walls $16^b$ and $16^c$ of the fairings 16 with the result that when the rudder is swung or turned in a clockwise direction substantially to its fullest extent the fairings 17 effect filling and sealing of the pressure sides of the notches 14.

The rear ends of the vertically extending walls of the fairings 16 and 17 are curved inwards to a gradual extent in the direction of the pivot members 10 of the housings 8 of the hinge brackets and the front ends of said vertically extending walls of the fairings are curved inwards more abruptly, as best shown in Figure 4.

When the airplane A is in flight and the pilot swings the rudder $a^2$ in a counterclockwise direction to substantially its fullest extent the fairings 16 come into play and serve, as hereinbefore pointed out, to fill and streamline the pressure sides of the notches 14 to the end that eddy currents and turbulences adjacent the pressure areas of the notches together with resultant fluttering and buffeting of the rudder are avoided or eliminated. When the rudder $a^2$ in connection with flight of the airplane A is swung by the pilot to its fullest extent in a clockwise direction the fairings 17 are brought into play and serve to fill and streamline the pressure sides of the notches 14 with the result that the hinge areas present a smooth or streamline contour to the slip stream.

The herein described fairings effectively and efficiently fulfill their intended purpose. They are light in weight and may be applied to the hinge brackets 7 with facility.

Whereas the fairings have been specifically described in connection with hinge brackets for a counter-balanced rudder it is to be understood that they may be used in connection with hinge brackets for other areo-dynamic control surfaces, such, for example, as ailerons, elevators, flaps and control surface tabs. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. In an airplane having a fixed surface with rearwardly projecting hinge brackets along its trailing portion and in addition a control surface positioned behind the fixed surface, embodying notches in its leading portion for the hinge brackets and provided with pivot means between it and the rear ends of the brackets, fairings disposed adjacent the sides of the hinge brackets and adapted and arranged to fill and streamline the pressure sides of the notches when the control surface is deflected or pivoted in either direction to substantially its fullest extent in connection with a flight maneuver.

2. In an airplane having a fixed surface with rearwardly projecting hinge brackets along its trailing portion and in addition a control surface positioned behind the fixed surface, embodying notches in its leading portion for the hinge brackets and provided with pivot means between it and the rear ends of the brackets, pairs of fixedly mounted fairings associated respectively with, and positioned on opposite sides of, the hinge brackets and adapted and arranged to fill and streamline the pressure sides of the notches when the control surface is deflected or pivoted in either direction to substantially its fullest extent in connection with a flight maneuver.

3. In an airplane having a fixed surface with rearwardly projecting hinge brackets along its trailing portion and in addition a control surface positioned behind the fixed surface, embodying notches in its leading portion for the hinge brackets and provided with pivot means between it and the rear ends of the brackets, fairings connected to, and disposed outwards of, the sides of the hinge brackets and adapted and arranged to fill and streamline the pressure sides of the notches when the control surface is deflected or pivoted in either direction to substantially its fullest extent in connection with a flight maneuver.

4. In an airplane embodying a fixed surface with rearwardly projecting hinge brackets along its trailing portion and in addition a control surface positioned behind the fixed surface, having its leading portion transversely rounded and provided with notches for the hinge brackets, and equipped with pivot means between it and the rear ends of the brackets, pairs of rearwardly convergent fairings associated respectively with, and disposed adjacent and outwards of, the sides of the hinge brackets and adapted and arranged to fill and streamline the pressure sides of the notches when the control surface is deflected or pivoted in either direction to substantially its fullest extent in connection with a flight maneuver.

5. In an airplane embodying a fixed surface with rearwardly projecting hinge brackets along its trailing portion and in addition a control surface positioned behind the fixed surface, embodying notches in its leading portion for the hinge brackets and provided with pivot means between it and the rear ends of the brackets, channel shaped fairings disposed adjacent and outwards of the sides of the hinge brackets, provided with inwardly extending walls in connected relation with said sides of the hinge brackets, and adapted and arranged to fill and streamline the pressure sides of the notches when the control surface is deflected or pivoted in either direction to substantially its fullest extent in connection with a flight maneuver.

THEODORE P. HALL.